J. M. HOTCHKISS.
APPARATUS FOR CLEANING GOLD, SILVER, AND OTHER METAL WARE.
APPLICATION FILED APR. 12, 1912.

1,068,388.

Patented July 22, 1913.

Witnesses
Frank Hough
C. C. Hines

Inventor
James M. Hotchkiss

By Victor J. Evans
Attorney

UNITED STATES PATENT OFFICE.

JAMES M. HOTCHKISS, OF BURLINGTON, VERMONT.

APPARATUS FOR CLEANING GOLD, SILVER, AND OTHER METAL WARE.

1,068,388.  Specification of Letters Patent.  Patented July 22, 1913.

Application filed April 12, 1912. Serial No. 690,224.

*To all whom it may concern:*

Be it known that I, JAMES M. HOTCHKISS, a citizen of the United States, residing at Burlington, in the county of Chittenden and State of Vermont, have invented new and useful Improvements in Apparatus for Cleaning Gold, Silver, and other Metal Ware, of which the following is a specification.

This invention relates to an apparatus or means for cleaning gold, silver and other metal ware, the object of the invention being to provide a simple, cheap and efficient method and means for rapidly cleaning metals by electrolysis.

Figure 1:
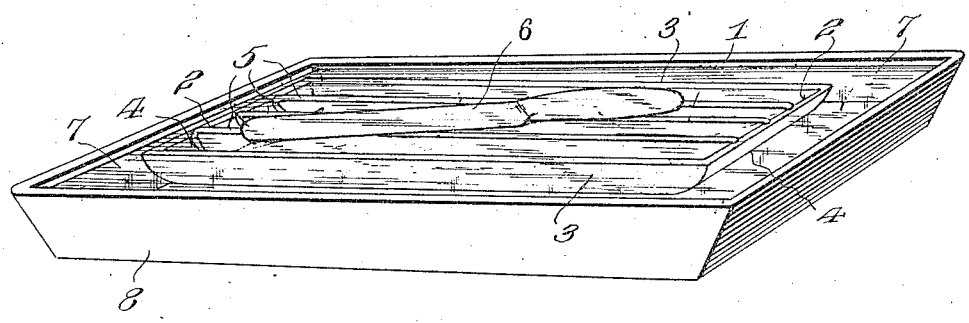
Figure 2:
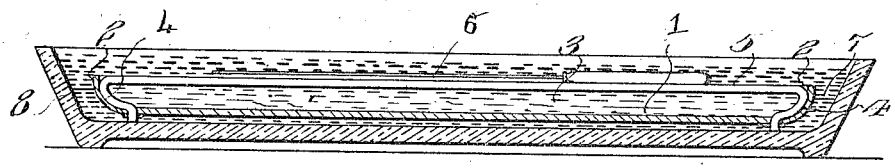
Figure 3:
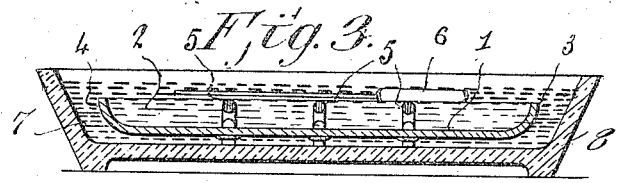

In the accompanying drawing,—Figure 1 is a perspective view showing the mode of cleaning a piece of metal ware. Figs. 2 and 3 are longitudinal and transverse sections through the battery element employed.

In carrying my invention into practice, I employ a battery element comprising a tray-like body 1, preferably of oblong rectangular or similar form, and having upwardly projecting side and end walls 2 and 3, forming a shallow pan-shaped support. The end walls 2 of this support are provided with grooves 4 in which are fitted and suitably secured the downwardly bent ends of a series of wires 5 extending longitudinally above the body 1 and providing a grate-like surface on which the metallic article or articles 6 to be cleansed are placed. As shown, the downwardly bent ends of the wires preferably project through the bottom of the body and form legs to support the body at an elevation, to enable the electrolyte to come in contact with all surfaces thereof. The body 1 is made of zinc and the wires 6 composing the rack are made of copper.

In carrying out the process, I first prepare an electrolytic bath or solution formed of ordinary table salt (chlorid of sodium) and water, combined in the proportions of about two table-spoonfuls of salt to a quart of luke warm water. This solution 7 is placed in a shallow earthenware or other suitable non-conducting vessel 8 having a bottom large enough to support the battery element and permit the latter to lie flat thereon and to be immersed in the solution, after which the article or articles to be cleansed are placed upon the grating 5. An electric battery is thus formed which decomposes the water. If the hydrogen, which is then in a nascent state, is allowed to pass off through gold or silver ware which is placed upon the copper grating, the hydrogen combines with the oxids, which appear in the form of tarnish, and removes them, leaving the ware bright and clean, and as the hydrogen will not combine chemically with the silver or silver ware, the ware will be cleansed without injury.

An important advantage arising from the use of the method herein described resides in the fact that an ordinary crockery dish of suitable size may be used with economy to hold the battery element and electrolyte, and that a battery element which is simple and inexpensive of construction and adapted to last a long time may be used, thus enabling the process to be employed by hotels and even small householders for periodically cleaning silver or gold ware without the necessity of maintaining an elaborate or expensive equipment. Furthermore, a battery element which is durable and not subject to rapid decomposition is provided, and is adapted for use in connection with a bath which may be easily prepared, thus providing a process which may be carried out by any one of ordinary intelligence.

Having thus described the invention, what I claim as new is:—

1. An apparatus for cleaning metalware comprising an outer vessel, a shallow tray-like receptacle formed of zinc disposed therein, a rack formed of a series of parallel copper bars disposed within the receptacle and terminally connected therewith, said bars having projecting ends forming feet to support the receptacle above the bottom of the outer vessel, and an electrolyte consisting of a solution of sodium chlorid in water contained within said outer vessel and within which said tray and rack are immersed.

2. In an apparatus for cleaning metal ware a shallow tray-like receptacle formed of zinc and a rack formed of a series of copper bars extending longitudinally of said receptacle, said bars having their end portions bent and secured to the receptacle and projecting downwardly therethrough to provide supporting legs.

In testimony whereof I affix my signature in presence of two witnesses.

JAMES M. HOTCHKISS.

Witnesses:
 OTIS A. HALL,
 JULIA A. HALL.